B. A. GRAMM.
AUXILIARY DRIVING MECHANISM.
APPLICATION FILED FEB. 12, 1916.
1,194,994.
Patented Aug. 15, 1916.
2 SHEETS—SHEET 1.
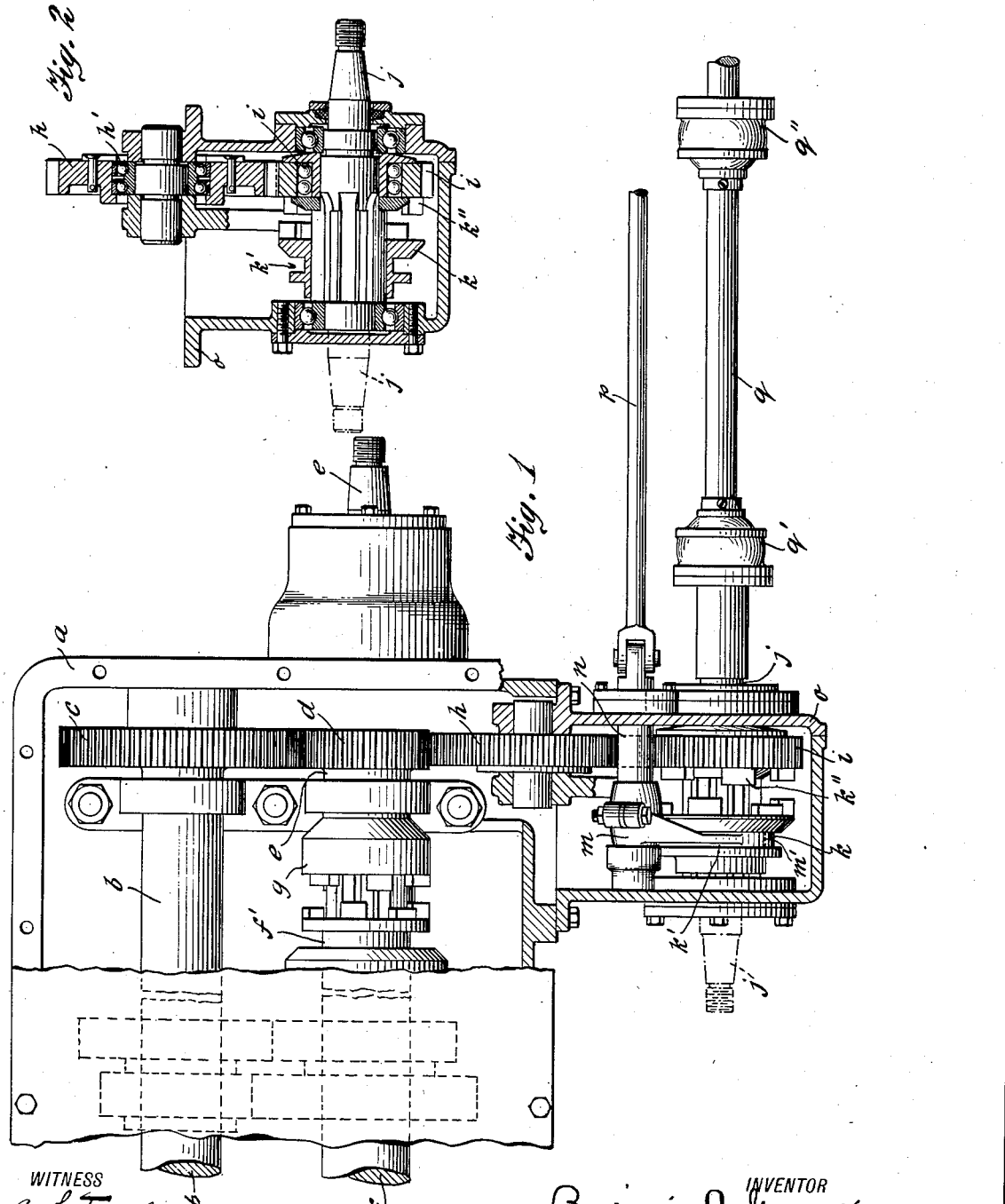

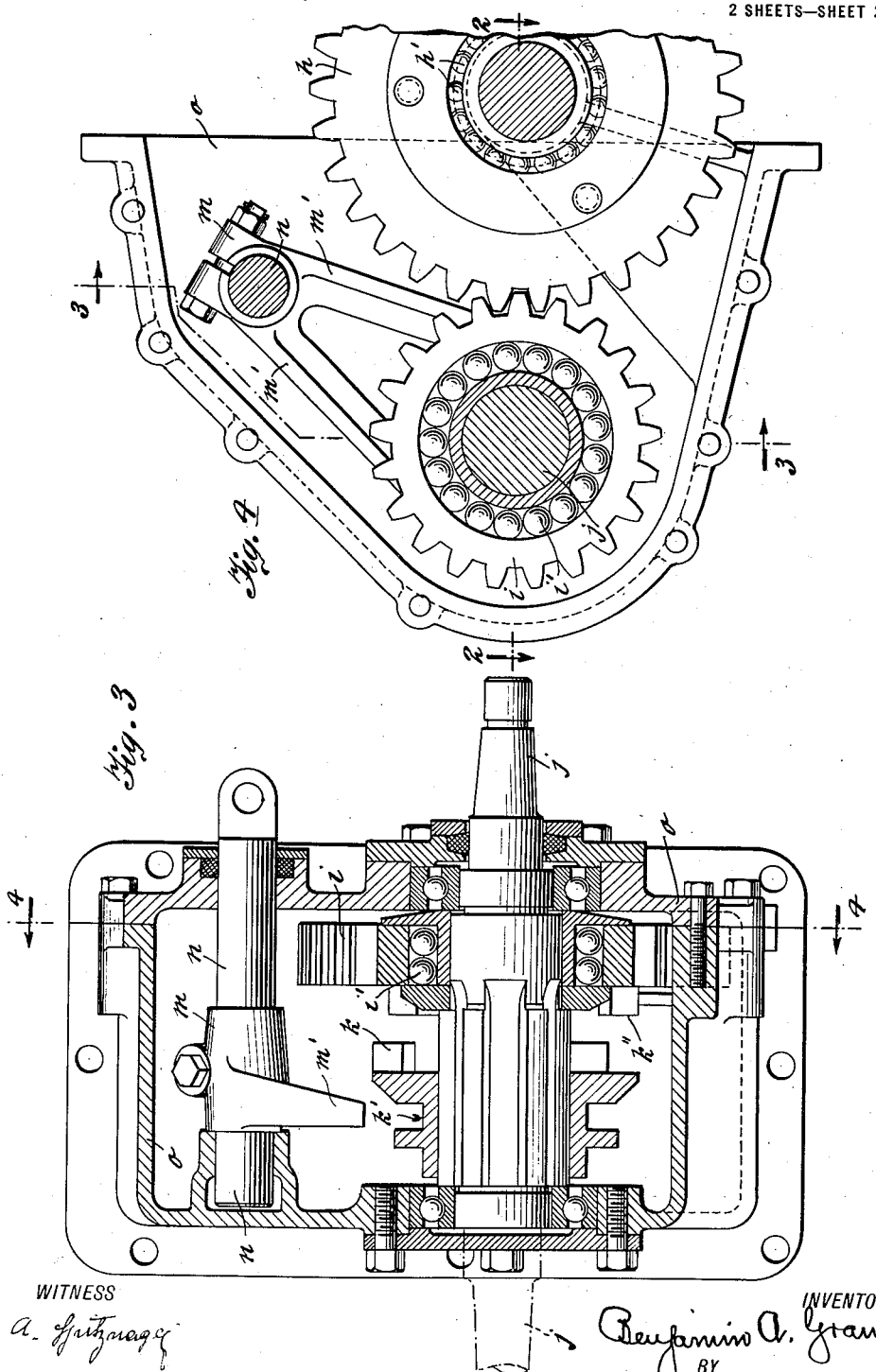

UNITED STATES PATENT OFFICE.

BENJAMIN A. GRAMM, OF LIMA, OHIO.

AUXILIARY DRIVING MECHANISM.

1,194,994.  Specification of Letters Patent.  Patented Aug. 15, 1916.

Application filed February 12, 1916. Serial No. 77,831.

*To all whom it may concern:*

Be it known that I, BENJAMIN A. GRAMM, a citizen of the United States of America, residing at Lima, in the county of Allen and State of Ohio, have invented certain new and useful Improvements in Auxiliary Driving Mechanisms, of which the following is a specification, reference being had to the accompanying drawings.

This invention relates to improvements in auxiliary driving mechanisms actuated by automobile transmission mechanism; and an object of this invention is to provide an auxiliary driving mechanism by which power may be taken from the main driving gear of the transmission and used for driving secondary mechanisms (such as hoists, pumps, winches, etc.) that may be mounted on the automobile or motor truck of which the transmission forms a part.

In the drawings illustrating the principle of this invention and the best mode now known to me of applying that principle, Figure 1 is a plan of an automobile transmission having my new attachment fastened thereto, partly in section and part of the cover of the transmission case being omitted for clearness; Fig. 2 is a section on the line 2—2 of Fig. 4, this section being on a scale smaller than the latter figure; Fig. 3 is a section on the line 3—3 of Fig. 4; and Fig. 4 is a section on the line 4—4 of Fig. 3.

In the transmission-case $a$, there is journaled a rotatable shaft $b$ on which is mounted fast a spur gear $c$ that meshes with a smaller gear or pinion $d$ fast on the engine (or motor) shaft $e$. When it is desired to drive the transmission-shaft $f$ directly from the motor-shaft $e$, the clutch-member $f'$, which is keyed or splined to the transmission-shaft $f$, is thrown into engagement with the clutch-member $g$ mounted fast upon this motor (or engine) shaft $e$. Of course, the clutch-member $f'$ is slidable lengthwise of the latter shaft and is, by reason of being keyed or splined thereto, rotatable therewith. However, the clutch-members $f'$, $g$, have no necessary part in the operation of the auxiliary driving mechanism herein described. The pinion $d$ meshes with an idler-gear $h$ which is mounted on a ball-bearing $h'$; and this idler-gear $h$ meshes with an idler-gear $i$ that is likewise mounted on a ball-bearing $i'$ (Figs. 2, 3 and 4).

Keyed or splined to the shaft $j$ is a dog or clutch-member $k$ that rotates with the shaft $j$ but is free to be slid therealong. The arms $m'$ of a shifter-fork $m$ engage in a circumferential groove $k'$ formed in the dog or clutch-member $k$. The shifter-fork $m$ is fastened on the inner end of a shifter-rod $n$ the other end of which projects through the casing $o$ in which the auxiliary driving mechanism is housed and which is fastened to the transmission case $a$ at one side of an end thereof (Fig. 1); and, to this projecting outer end, there is fastened a shifter-bar $p$. Fast to the idler-gear $i$, there is mounted a clutch-member $k''$ which coöperates with the clutch-member $k$. It is obvious that, when the clutch-members $k$, $k''$, are in clutching engagement, the shaft $j$ will be driven from the idler-gear $i$ through the clutch-members $k''$, $k$. The shaft $j$ projects outside of the casing $o$; and, upon this projecting end of the shaft $j$, there is mounted a propeller-shaft $q$ that is provided with universal joints $q'$, $q''$. From this propeller-shaft, power may be taken for the purpose of driving hoists, winches, fire-pumps, street-flusher pumps and the like (not shown) that are carried by the automobile of which the transmission mechanism hereinbefore described is a part.

As is clearly indicated by the dotted lines in Figs. 1, 2 and 3, the shaft $j$ of the auxiliary driving mechanism may be made to project from the rear end of the casing $o$ instead of the front end thereof; therefore, it results that the propeller-shaft $p$ may be driven from either the front or the rear of the casing $o$. Since this mechanism is driven from the transmission, it is entirely practicable so to arrange the parts that, as is herein shown, the two form together a complete unit that is oil-tight and dust-proof.

I am aware of the patent granted Samuel W. Luitwieler, No. 1,023,084, April 9, 1912, for variable speed mechanism. In the mechanism described in this patent, the transmission mechanism cannot be connected with the driving-shaft, when the latter is connected with the auxiliary driving mechanism to actuate the same. But in the mechanism hereinbefore described, the transmission-shaft $f$ may, through the power-transmitting device $f'$, be maintained in connection with the driving-shaft $e$, while the shaft $j$ of the auxiliary driving mechanism is being driven from the driving-shaft $e$. Thus it is possible to move the automobile (e. g., a dumping truck) back and forth, while the auxiliary driving mechanism is being operated; and this is of particular advantage where the auxiliary driving mechanism is used for actuating the mechanism that elevates the body of the automobile (e. g., a dumping-truck). In the spreading of sand, stone, gravel, asphalt and the like, it will be found particularly advantageous to be able to move the automobile backward and forward, while the body of the automobile is, at the same time, being raised by power furnished by the auxiliary driving mechanism hereinbefore described.

I claim:

1. The combination of a main driving shaft; an automobile transmission shaft arranged to be driven thereby; a power-transmitting device by which said shafts are thrown into and out of operative connection with each other; an auxiliary driving mechanism driven by said main driving shaft; an auxiliary driving shaft arranged to be driven by said auxiliary driving mechanism; and means independent of said power-transmitting device for connecting said auxiliary driving shaft with and disconnecting the same from said auxiliary driving mechanism while said main driving shaft is in driving connection with said transmission shaft.

2. The combination of a main driving shaft; an automobile transmission shaft arranged to be driven thereby; a power-transmitting device by which said shafts are thrown into and out of connection; a transmission case within which said transmission shaft is housed; an auxiliary driving mechanism driven by said main shaft; a housing for said auxiliary driving mechanism, said housing being carried by said transmission case; an auxiliary driving shaft arranged to be driven by said auxiliary driving mechanism; and means independent of said power-transmitting device for connecting said auxiliary driving shaft with and disconnecting the same from said auxiliary driving mechanism, while said main driving shaft is in driving connection with said transmission shaft.

3. The combination of a main driving shaft; an automobile transmission shaft arranged to be driven thereby; a power-transmitting device by which said shafts are thrown into and out of connection; an auxiliary driving shaft; an idler-gear arranged to be driven by said main driving shaft; and means independent of said power-transmitting device for connecting said auxiliary driving shaft with and disconnecting the same from said idler-gear, while said main driving shaft is in driving connection with said transmission shaft.

4. The combination of a main driving shaft; an automobile transmission shaft arranged to be driven thereby; a power-transmitting device by which said shafts are thrown into and out of connection; a transmission case within which said transmission shaft is housed; an idler-gear arranged to be driven by said main driving shaft; a housing for said idler gear, said housing being carried by said transmission case; an auxiliary driving shaft; a slidable clutch member keyed to the latter; and a shifter for throwing said clutch member into and out of clutching engagement with said idler gear, while said main driving shaft is in driving connection with said transmission shaft.

Signed at Lima in the county of Allen and State of Ohio, this third day of February, A. D. 1916, in the presence of the two undersigned witnesses.

BENJAMIN A. GRAMM.

Witnesses:
ELEANOR FISHER,
H. E. WHEELER.